United States Patent [19]

Dolan et al.

[11] 4,358,468

[45] Nov. 9, 1982

[54] PROCESS FOR PREPARING A MARBLED MEAT PET FOOD

[75] Inventors: Francis H. Dolan, Roseneath; Michael S. Conner, Cobourg, both of Canada

[73] Assignee: General Foods Inc., Canada

[21] Appl. No.: 228,532

[22] Filed: Jan. 26, 1981

[30] Foreign Application Priority Data

Feb. 6, 1980 [CA] Canada .................................. 345155

[51] Int. Cl.³ .......................... A23J 3/00; A23L 1/275
[52] U.S. Cl. .................................. 426/250; 425/376 R; 426/513; 426/635; 426/657; 426/802; 426/104
[58] Field of Search ................. 426/104, 92, 802, 635, 426/249, 250, 516, 513, 657; 425/376 R, 376 B

[56] References Cited

U.S. PATENT DOCUMENTS

| | | | |
|---|---|---|---|
| 3,765,902 | 10/1973 | Charter | 426/92 |
| 3,793,466 | 2/1974 | Hawkins et al. | 426/274 |
| 3,940,495 | 2/1976 | Flier | 426/104 |
| 4,061,789 | 12/1977 | Warren | 426/802 |
| 4,303,682 | 12/1981 | Guitteny et al. | 426/802 |

Primary Examiner—Raymond N. Jones
Assistant Examiner—George C. Yeung
Attorney, Agent, or Firm—Thomas A. Marcoux; Howard J. Newby; Daniel J. Donovan

[57] ABSTRACT

A room temperature storage stable meat-containing solid pet food having a moisture content within the intermediate moisture range and simulating in appearance and texture marbleized lean red meat in chunk form prepared by a process which comprises co-extruding a first ingredient phase simulating lean meat and a second ingredient phase simulating fat into and through an enclosed blending compartment having oriented therein a plurality of stationary elements which cut, divide and axially rotate substantial portions of the first and second ingredient phases and simultaneously maintaining a pressure within the blending compartment from about 250 to 400 psig sufficient to bind the phases together and to form a casting of randomly blended first and second ingredient phases; heat setting the casting of blended ingredient phases to form a structurally stable material; and subdividing and shaping the heat set casting of blended phases into small pieces resembling small cuts of lean meat marbled with fat.

7 Claims, 5 Drawing Figures

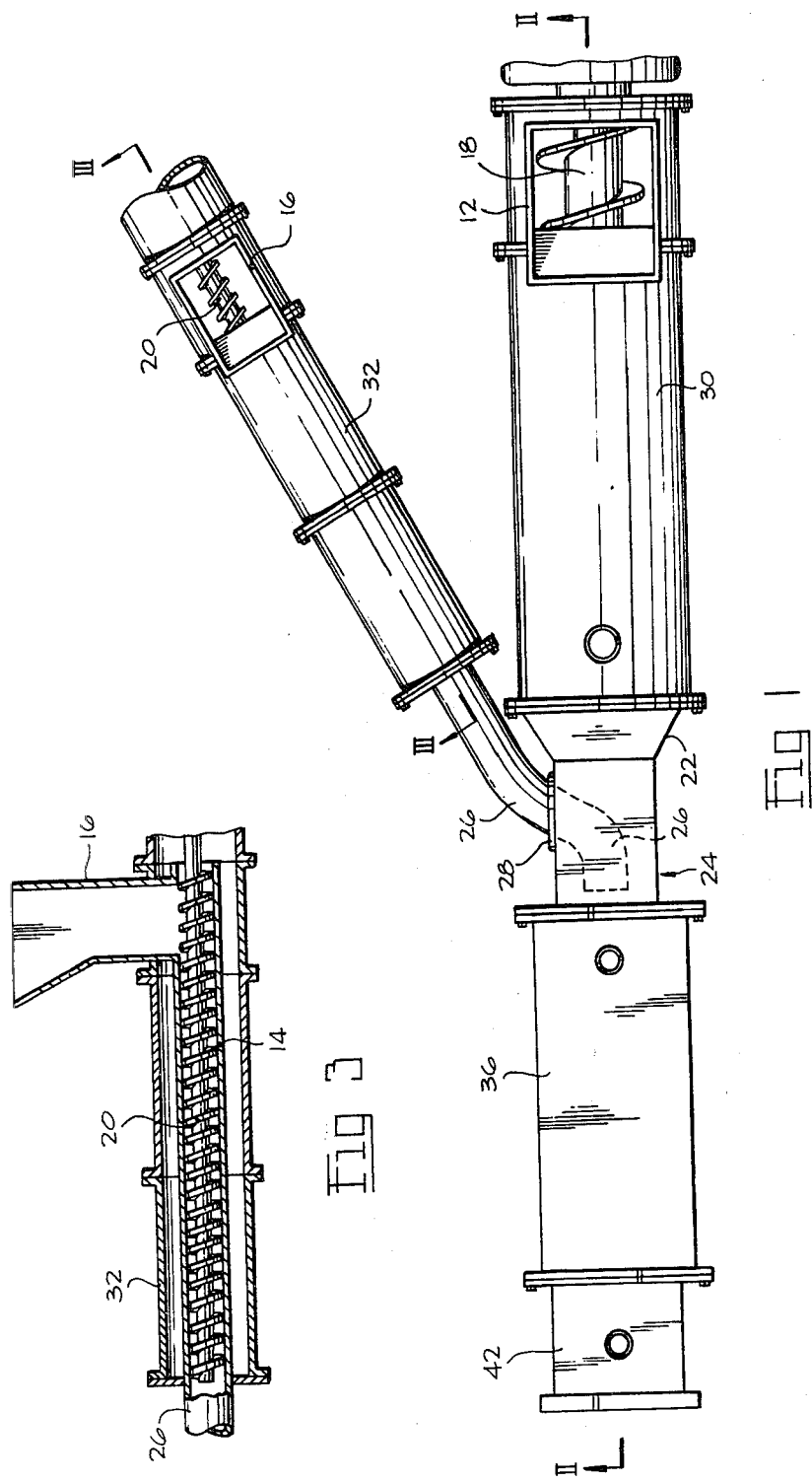

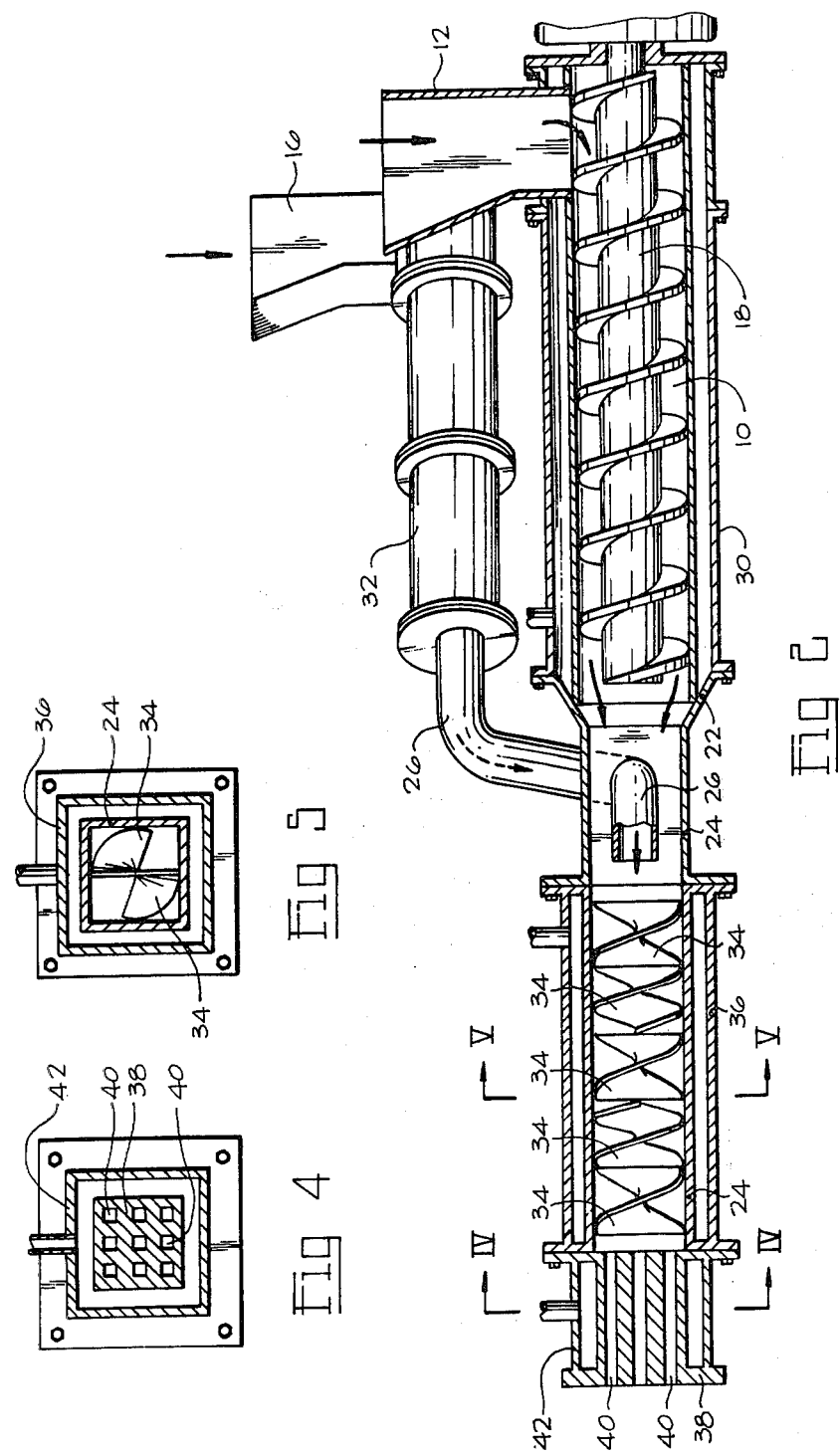

PROCESS FOR PREPARING A MARBLED MEAT PET FOOD

TECHNICAL FIELD

This invention relates, in general, to pet foods and, in particular, is directed to an intermediate moisture solid proteinaceous pet food in appetizing chunk form which resembles red meat marbled with fat, and to process and apparatus for preparation.

BACKGROUND ART

The successful commercial exploitation of meat-containing intermediate moisture pet foods emanating from the inventive development of Burgess et al. (Canadian Pat. No. 739,897) has spurred the food industry to adapt the basic principles set forth toward further product and process improvements-mainly in the nature of preparing pet foods in forms other than the original room temperature storage stable hamburger patty disclosed by Burgess et al.

As recognized by those in the meat industry, tender and juicy meat chunks are characterized by having a significant amount of fat distribution throughout the lean or red meat portions in a randomized fashion producing the chunk with a mottled or marbleized appearance. The prior art, cognizant of the appeal to the owner of pets of the marbled appearance of meat due to the association of this feature with tenderness and juiciness, have attempted to incorporate a marbled appearance in the product made from formulation and produced to resemble raw beef chunks.

Canadian Pat. No. 842,164-Bone discloses a method for manufacture of a meat-containing semi-moist pet food simulating marbleized red meat chunks containing a significant level (7½ to 25% by weight of the red meat formulation) of a caseinate salt binder. The method of Bone involves laminating red meat and white "fat" layers or sheets of the semi-moist formulations; forming loaves of the laminate; and then subdividing the loaves into small size cubes.

Charter, in U.S. Pat. No. 3,765,902, mentions that the process of Bone suffers from the disadvantage of requiring excessive personal attention, and discloses apparatus for producing a caseinate binder product similar to that of Bone with a minimum of human control.

The methods of Bone and Charter both apparently rely upon the caseinate adhesive to provide an extrudate which is sufficiently tacky, or sticky, at temperatures above about 120° F. to effect proper joining of the red and white portions to form an integral mass having substantially distinct interface between the portions.

DISCLOSURE OF INVENTION

The present invention relates to unique method and apparatus for blending and binding the two ingredient phases of an improved intermediate moisture pet food which does not contain nor require a caseinate salt binder or equivalent for the production of a structurally stable marbleized product.

The present invention also encompasses an intermediate moisture, caseinate binder-free, room temperature storage stable, meat-containing solid pet food resembling rare red meat marbled with fat.

Briefly, the present invention relates to a method for the manufacture of a pet food having the appearance and texture of chunks of marbleized red meat by a process which encompasses co-extruding a red meat formulation, and a white "fat" formulation into and through a unique blender apparatus, extruding the blended red and white formulation in the form of rods and subdividing the rods into chunks of extrudate resembling red meat marbleized throughout with fat.

More specifically, the present invention relates to a process for the preparation of a plastic proteinaceous pet food having a first ingredient phase simulating lean meat intermixed with a second ingredient phase simulating fat and shaped to resemble small cuts of marbled meat which comprises:

pressure casting the first ingredient phase into elongated rectangular form and pressure casting the second ingredient phase centrally into the elongated rectangular form of the first ingredient phase;

urging the combined casting of first and second ingredient phases through an enclosed elongated compartment having oriented therein a plurality of stationary baffle elements which cut, divide and axially rotate substantial portions of the casting in a manner to randomly blend the first and second phases without altering the outlying physical dimensions of the casting, thereby converting the casting to that of a casting of randomly blended first and second ingredient phases;

heat setting the casting of blended ingredient phases to blend the phases together and to form a structurally stable material; and subdividing and shaping the heat set casting of blended phases into small pieces resembling small cuts of lean meat marbled with fat.

In accordance with a preferred process the first (red meat) and the second (fat) ingredients are cooked prior to coextrusion.

The pet food product so produced by the method of the invention represents a distinct improvement over the products of the prior art in that no caseinate binder is necessary in the formulations and the product has a superior marbling effect which provides it with an appearance more like that of tender, juicy red meat than any other intermediate moisture pet food known to the applicants.

The method of the invention is relatively simple as compared with the methods of the prior art heretofore described. The salient feature of the invention and that which leads to the improved product is the method of incorporating the red and white phases to provide a realistic marbleized effect to the finished product.

The instant invention also relates to improvements over prior art extruder apparatus and extruding mechanisms and to the provision of room temperature stable intermediate moisture solid pet foods simulating in appearance and texture marbleized red meat between controllable physical specifications at sustained, commercially economical production rates.

Further and additional features and advantages of the present invention will become apparent from the following description in conjunction with the accompanying drawings.

More specifically, the present invention also relates to apparatus for the preparation of a plastic proteinaceous pet food having a first ingredient phase simulating lean meat and a second ingredient phase simulating fat, blended and shaped to resemble small cuts of lean meat marbled with fat comprising:

first means for pressure casting the first ingredient phase into an elongated ingredient receiving and blending compartment at its upstream end, and a hollow core positioned centrally within the upstream end of the compartment;

second means of capacity smaller than the first means for pressure casting the second ingredient phase centrally into the compartment through the hollow core;

a number of stationary, helically-curved baffles positioned in tandem in the compartment downstream of the hollow core;

upstream and downstream edges of the baffles being substantially straight and the downstream edge of each baffle being immediately adjacent and at an angle to the upstream edge of the following baffle;

the baffles during passage of the ingredients cutting, dividing and axially rotating substantial portions of the ingredients to randomly blend the first and second ingredient phases; and a die block at the downstream end of the compartment through which the blended ingredients are extruded.

BRIEF DESCRIPTION OF DRAWING

FIG. 1 is a top plan view of the apparatus of the invention;

FIG. 2 is a side elevational view, partly sectional, taken along line II—II of FIG. 1;

FIG. 3 is a sectional elevational view of the apparatus taken along line III—III of FIG. 1;

FIG. 4 is a sectional elevational view of a dieblock taken along line IV—IV of FIG. 2; and FIG. 5 is a cross sectional view of the blending composition taken along line V—V of FIG. 2.

DETAILED DESCRIPTION OF ACCOMPANING DRAWINGS AND BEST MODE MADE FOR CARRYING OUT THE INVENTION

In the drawings, like reference numerals refer to like parts.

As will be understood from the following description read in conjunction with the drawing, the inventive process comprises bringing together a red meat formulation and a white "fat" formulation, blending the two formulations to obtain a marbleizing effect of fat within red meat, binding the blending phases together, and shaping the product to simulate cubes or chunks of red meat, marbled with fat.

The formulation for a red meat phase and for a white "fat" phase are well within the knowledge of those in the pet food art.

Basic information and data on meat-containing intermediate moisture formulations is provided by Burgess et al., in Canadian Pat. No. 739,897. The Burgess et al. patent discloses the essential ingredients and basic operational steps to provide meat-containing pet foods having a semi-moist mouthfeel and containing sufficient aqueous solute to render them microbiologically stable for prolonged periods when stored at room temperatures.

For the purpose of this invention the following formulations are presented as representative of those which yield the desired products when processed according to the method of the invention. The invention, however, should not be construed to be limited to the listed formulations since it is sufficiently broad in scope to encompass many formulations.

To effect the proper degree of marbling the ratio of red meat phase to white "fat" phase should range from about 10:1 to about 2:1 respectively by weight.

Representative Formulas

Red Meat Phase

| Ingredient | Parts by Weight |
| --- | --- |
| *Beef By-Products | 31.4 |
| Soya Meal (49% Protein) | 27.5 |
| Sugar | 18.0 |
| Modified Starch | 4.00 |
| Propylene Glycol | 4.00 |
| Tallow | 4.00 |
| Soya Hulls | 2.70 |
| Monocalcium Phosphate | 2.60 |
| Whey Powder | 2.20 |
| Emulsifier | 0.860 |
| Iodized Salt | 0.850 |
| Carboxy Methyl Cellulose | 0.500 |
| Potassium Sorbate | 0.250 |
| Vitamin E Supplement | 0.0908 |
| Riboflavin Supplement | 0.00924 |
| Allura Red Food Coloring | 0.00900 |
| Amaranth | 0.00300 |
| Vitamin A Supplement | 0.00132 |
| Vitamin D Supplement | 0.00132 |
| Thiamine Hydrochloride | 0.000671 |
| Cobalt sulphate | 0.000594 |
| Water | 1.00 |
| | 100. |
| *Beef By-Products | |
| Scalded Tripe | 15.7 |
| Washed Tripe | 15.7 |

White Fat Phase

| Ingredient | Parts by Weight |
| --- | --- |
| Scalded Tripe | 30.2 |
| Soya Meal | 31.6 |
| Sugar | 18.0 |
| Modified Starch | 4.00 |
| Propylene Glycol | 4.00 |
| Tallow | 4.00 |
| Monocalcium Phosphate | 2.60 |
| Whey Powder | 2.20 |
| Titanium Dioxide | 1.00 |
| Emulsifier | 0.860 |
| Iodized Salt | 0.850 |
| Carboxy Methyl Cellulose | 0.500 |
| Potassium Sorbate | 0.250 |
| | 100. |

The modified starch is included in the formulations primarily for the purpose of providing the product with a shiny surface appearance. The starch also augments the binding characteristics of the formulation when processed by the method of the invention.

The formulations are cooked at or above atmospheric pressure for about 15 minutes and each is then charged to its respective conveyor-extruder.

Briefly, the two extruders are of dissimilar size and are at an angle with respect to each other (see FIG. 1). The larger extruder has a cone-shaped head attachment that converges into a section of tubing of rectangular or square cross-section. The red meat phase portion is extruded through the large extruder. The smaller extruder has a circular tube leading from it and extending into the center of the rectangular cross-section tubing. The white fat phase portion is extruded and forced through the circular tube. Both the red and white portions are thus pressure fed through the rectangular cross-sectioned tubing enclosing a helical-type mixing device which splits, axially turns, and binds the two materials. This method of splitting and turning produces an excellent marbleizing effect. The marbleized material is then extruded through a heated die which shapes it into square-shaped rod configurations and a revolving knife at the die face cuts the product into desired lengths. The resultant cubes may then be passed under a roller to flatten and otherwise slightly distort their uniformity of shape and size and are subsequently air cooled prior to packaging.

Referring to FIGS. 1 and 2 of the drawings, the red meat formulation is charged to the larger extruder 10 by means of the hopper 12 and the smaller quantity of white fat phase is charged to the smaller extruder 14 through hopper 16.

To accommodate the preferred red meat to white fat ratio the larger extruder should have 10 times the capacity of the smaller.

For a small scale commercial operation producing about 2,200 pounds of product per hour it has been established that an 8" diameter extruder 10 operating at an auger speed of 5 rpm is adequate for the red meat phase and a 2" diameter extruder 14 operating at an auger speed of 12 rpm is adequate for the white fat phase.

The larger extruder 10 has a cone-shaped discharge head attachment 22 that slopes conically into an ingredient receiving and blending compartment 24 which is preferably square in cross-section providing at its upstream end an ingredient receiving area of rectangular (preferably square) parallelepiped configuration. The first or red meat ingredient forced into chamber 24 by auger 18 will then assume a rectangular parallelepiped form. The ingredient receiving compartment 24 will be in the order of 4" square when used with the 8" and 2" extruder size as discussed above.

The smaller extruder 14 delivers the white phase to the center of the ingredient receiving compartment 24 by means of a section of circular tubing 26 which communicates with the ingredient-receiving chamber through a port 28 in the side of the compartment. In keeping with the other dimensions for the apparatus mentioned above the circular tubing 26 will have a 2" diameter.

The red and white phases are, therefore, urged into the upstream end of the compartment 24 as a square cross-sectional and rectangular bar of red phase having a central core of circular cross-sectional area of white phase.

Both extruders 10, 14 are equipped with jackets 30, 32, respectively, for maintaining the temperature of each phase of ingredients within a desired range of 40° to 100° C.

The downstream portion of the compartment 24 has a plurality of fixed, stationary, flow-restricting generally helically-shaped baffles 34 joined in tandem and at substantial angles to one another. Each baffle is comprised of a smooth, thin sheet of material, preferably metal, whose width equals the width of the square-cross blending compartment 24. The length of each baffle is approximately 1 to 1½ time its width.

The thin sheet of metal of each baffle 34 is twisted so that the two ends (the upstream and downstream edges), which are substantially straight, are at a substantial angle of about 110° to 120° to each other. The curved baffles are positioned so that the downstream edge of each is immediately adjacent and at an angle to the upstream edge of the next adjacent baffle. Thus, a generally-helical cut-flight path is formed within the downstream end of the blending compartment wherein the extruded material is cut and rotated as it is urged against the edges of the baffles and over and along their curved surfaces.

Essentially, as the rectangular bar of red phase with a central core of white phase is forced through the blending section the material is split and axially turned. It is this splitting and turning which creates the required marbling of the red meat phase with the less quantity of white fat phase.

The baffled-containing square blending chamber is steam jacketed 36 to maintain the temperature of the red and white phases at about 37°-75° C. to facilitate the cutting and radial turning of the mass for producing the desired marbling effect.

The blended (marbled) material passes from the blender section through a die 38 having a plurality of square-shaped orifices 40. The die block is steam jacketed 42 to maintain the blended material at a sufficiently elevated temperature (35° to 75° C.) for extrusion. The retention time of the material in the die is approximately one second.

The pressure within the blending compartment and the die ranges from about 250 to 400 psig which is sufficient to bind the heated phases together as they are being blended and extruded. The elevated temperature of 35°-75° C. causes the tallow component to melt and lubricate the surface of the equipment which in turn facilitates the passage of the material through the apparatus.

Upon exiting the die the extrudate is subdivided into cubes approximately ½"-¾" on edge by a revolving knife (not shown).

The subdivided extrudate may then be placed on a conveyor which carries it beneath a roller (not shown) to further flatten and compress the cube-shaped chunks (about ¾" on the edge) which are then air cooled to a temperature below 35° C. before packaging.

Thus, the technique for achieving the marbleization is unique. The product being made by the use of a quasi-helical mixing device and the particular positioning of the white fat phase portion with the red meat phase portion before being forced together into the mixing device.

Industrial Applicability

The simplicity of the operation lends it to a production oriented method for producing a marbleized dog food of excellent quality and appearance. The finished product being subjected to the unique process of marbling, exhibits a red phase which is veined or mottled with the white phase and resembles chunks of rare beef marbled with fat without the need for incorporating an acknowledged binding material such as wheat gluten, a high protein wheat flour, or expensive caseinate salts to maintain product integrity. As such the product has excellent nutritional and digestability qualities and satisfies those requirements for animal acceptance of the product which are, in a large measure, predicated upon the fact the product closely approaches the shiny surface appearance, texture, tastes and chewiness of natural meat chunks.

We claim:

1. A process for the preparation of intermediate-moisture pet food having a first ingredient phase simulating lean meat intermixed with a second ingredient phase simulating fat and shaped to resemble small cuts of marbled meat which comprises:

pressure casting the first ingredient phase into elongated rectangular form and pressure casting the second ingredient phase centrally into the elongated rectangular form of the first ingredient phase;

urging the combined casting of first and second ingredient phases through an enclosed blending compartment having oriented therein a plurality of stationary elements which cut, divide and axially rotate substantial portions of the casting in a manner to randomly blend the first and second phases without altering the outlying physical dimensions of the casting, and simultaneously maintaining a pressure within said blending compartment from about 250 to 400 psig sufficient to bind the phase together thereby converting the casting to that of a casting of randomly blended first and second ingredient phases;

heat setting the casting of blended ingredient phases to blend the phases together and to form a structurally stable material; and subdividing and shaping the heat set casting of blended phases into small pieces resembling small cuts of lean meat marbled with fat.

2. Process according to claim 1, wherein the second ingredient phase is pressure cast in elongated, circular cross-section form into the rectangular form of the first ingredient phase.

3. A process according to claim 1, wherein the first ingredient phase and the second ingredient phase are maintained at a temperature in the range of about 40° to 100° C. during pressure casting.

4. A process according to claim 1, wherein the ratio of the first ingredient phase to the second ingredient phase is in the range of about 10:1 to about 2:1 respectively by weight.

5. A process according to claim 1, wherein during random blending and heat setting the first and second ingredient phases are maintained at a temperature of about 35°–75° C.

6. A process according to claim 1, wherein the first and second ingredient phases are cooked prior to pressure casting.

7. A process according to claim 1, the first ingredient phase contains a major proportion of beef by-products and soya meal, and the second ingredient phase contains a major proportion of scalded tripe and soya meal.

* * * * *